June 5, 1928.
W. E. COOK
1,671,979
WIRE SPLICE
Filed Nov. 27, 1925
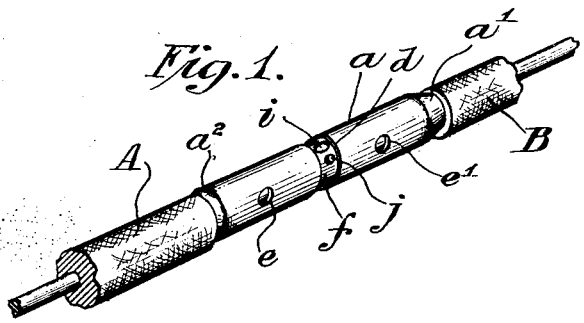
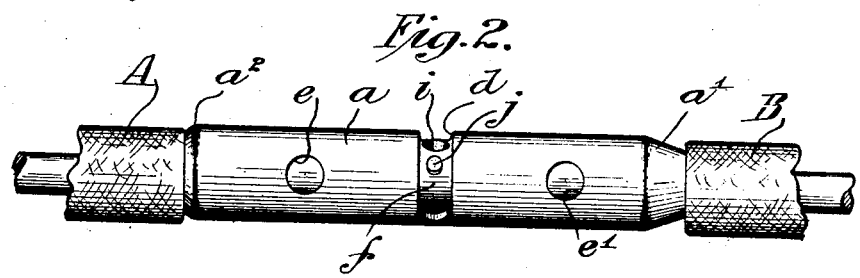
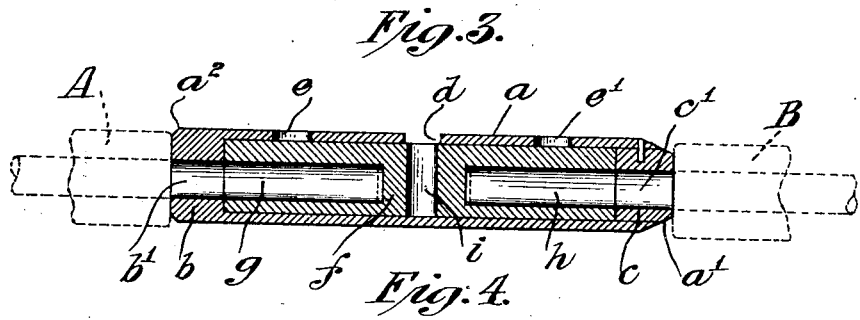
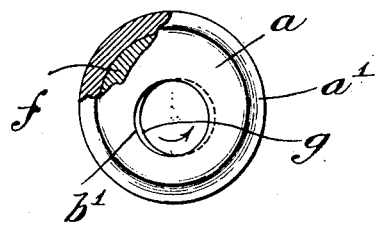
William E. Cook INVENTOR
BY Frank P. Wentworth ATTORNEY.

Patented June 5, 1928.

1,671,979

UNITED STATES PATENT OFFICE.

WILLIAM E. COOK, OF NEW YORK, N. Y.

WIRE SPLICE.

Application filed November 27, 1925. Serial No. 71,529.

My invention relates to a wire splice, and more particularly to a device of this character especially adapted for use during the manufacture of insulated conductor wires. In the manufacture of such wires of a type in which the body of the insulation consists of cotton sliver or similar material and in which a covering braid is used, the wire is first passed through the covering machine, by which the sliver is applied thereto; thereafter through a tubular braiding machine applying the covering braid to the tubular body, and in the final stages of the production of such wire, the wire and its insulated covering is passed through a bath of asphaltum, or other similar insulating fluid, and a machine for waxing and polishing the exterior of the wire.

With light conductor wires which have only a thin covering of insulation, no difficulty has been experienced in connecting the ends of different coils or lengths of wire, as the end of one length and the beginning of the succeeding length pass the compacting die. Such wires possess sufficient flexibility to permit the ends of the wires to be twisted together and thus secure a sufficiently strong connection to permit a plurality of lengths to be passed continuously through the braiding and other machines. The same is true when the braid is applied to separate lengths of light wire, and it is desired to connect these lengths prior to passing them through the asphaltum or other bath. With heavier wires, however, this manner of forming a splice is not permissible by reason of the rigidity of the wire.

When it is desired to make long lengths of wire, it is necessary to make a permanent splice by hand welding or swaging the adjoining ends of different lengths of the wire, but this practice is not followed except when continuous conductors are desired.

The splices commonly used in the installation of wires, are not suitable for use in making a temporary splice during the production of insulated wires, since in the latter instance after the splice has been made, it is necessary to pass the wire through certain machines and mechanisms, the operation of which would be interfered with by such splices.

With the above conditions in mind, I have provided a wire splice which may be quickly applied to the ends of heavy conductor wires in a manner to rigidly connect different lengths of wires while permitting the continuous passage of all lengths through a tubular braiding machine and other mechanisms used in the production of such wires.

The construction of the splice is such that it will not in any way interfere with the mechanisms of the machines through which the wire is passed, or with the winding of such wires upon, or their unwinding from, reels upon which the wires are accumulated. Its presence in the length of the completed wire may be readily detected during the final stage in the production of the wires so that it may be removed from the wire prior to the final coiling of the finished lengths of wire and their shipment.

The construction of the splice is such that it may be quickly applied to or removed from the wire ends, but will, when in use, so firmly grip the wire as to preclude possibility of the separation of the different lengths thereof even when subjected to those fairly heavy longitudinal stresses to which the wire is subjected while passing through different machines.

The invention consists primarily in a wire splice consisting of a short cylindrical casing having a bearing chamber therein and openings through the opposite ends thereof positioned eccentrically of the axis of said chamber, a cylindrical fitting rotatably mounted in said chamber with its axis concentric with the axis of said chamber and having circular sockets in the opposite ends thereof of substantially the same diameter as the end openings in said casing and having the same degree of eccentricity with relation to the axis of said chamber as said end openings, and means whereby relative rotative movement may be imparted to said casing and said fitting; and in such other novel characteristics as are hereinafter set forth and described, and more particularly pointed out in the claims hereto appended.

Referring to the drawings,

Fig. 1 is a perspective view of a wire splice embodying my invention showing it attached to adjacent ends of separate lengths of conductor wires;

Fig. 2 is an enlarged view of the splice shown in Fig. 1 and the adjacent wire ends;

Fig. 3 is a longitudinal section thereof with the wire ends indicated in dotted lines; and Fig. 4 is an end view with the parts in the position occupied when a splice has been made, the wire ends, however, being omitted.

Like letters refer to like parts throughout the several views.

In the embodiment of the invention shown in the drawings, A indicates a short section of wire adjacent the end of one length or coil, and B indicates a short section of wire adjacent the end of another length or coil, the insulation being broken away to indicate approximately the size of the conductor wire and the thickness of the insulation.

The splice proper consists of a short cylindrical casing $a$ having therein a bearing chamber, and ends $b$ and $c$ each having therethrough an opening $b'$ or $c'$, which openings are eccentric to the axis of said chamber. Said casing is preferably made of magnetic material.

The casing $a$ has through its wall and intermediate its ends $b$ and $c$, a slot $d$, and may also be provided with wrench holes $e$ and $e'$ upon the outside thereof for facilitating the gripping of the casing by means of a special tool when making the splice. If ordinary gas pliers are used for holding the casing, such opens have no utility.

Rotatably mounted within the casing $a$, having a fairly close pit with the circular and end walls of the chamber therein, in a cylindrical fitting $f$ having at the opposite ends thereof circular openings $g$—$h$ of the same diameter as the end openings $b'$—$c'$ and having the same degree of eccentricity as to the axis of the chamber in said casing $a$ as said openings $b'$—$c'$.

Intermediate the openings $g$—$h$ is a key opening $i$ so positioned as to be exposed through the slot $d$ and carried by said fitting $f$ is a stop pin $i$ movable in said slot $d$ for limiting the rotative movement of said fitting and serving as a guide to indicate when the openings $b'$ and $g$, $c'$ and $h$ are co-axial with each other.

The outside diameter of the casing $a$ is approximately the same as the outside diameter of the wire lengths connected by means of the splice so as not to interfere with the operation of the braiding machine. The overall length of the splice shown is approximately two inches, but the diameter of different splices may vary in order to adapt them to insulated wires having different capacities with a resultant increase in the thickness of the insulation.

One end of the casing $a$ is provided with a long exterior taper $a'$, which end is designed to be presented toward the machine in the final operation of waxing and polishing so as to avoid the presence of any abrupt increase in the diameter of the wire when passing through this machine. The other end is slightly rounded at $a^2$, to avoid the presence of a sharp edge at this point.

When connecting different lengths of wire with a splice embodying the invention, a short length of wire approximating the distance from the inner end of a socket $g$ or $h$ and the thickness of an end $b$ or $c$, is first stripped of insulation adjacent the end of each length of wire and cleaned. The fitting $f$ is then so turned as to bring the sockets $g$ and $h$ into axial alinement with the end openings $b'$ and $c'$ respectively. The bare conductor wire at the end of one length of insulated wire is then passed through one end opening, as $b'$, and into the adjacent socket $g$, and the stripped wire at the end of the other length of conductor wire is similarly passed through the end opening $c'$ and into the socket $h$.

A key is then inserted in the opening $i$, and the casing $a$ grasped by a suitable tool to hold it against, or to impart thereto, rotary movement. Force applied to this tool is resisted by a counter force applied to the key so as to ensure relative rotative movement of the fitting $f$ and the casing $a$ to ensure the destruction of the alinement previously existing between the end openings $b'$—$c'$ in the casing $a$ and the sockets $g$—$h$ in the fitting $f$.

This results not only in a powerful clamping action upon the wire, but slight deformation thereof at the bearing point between the ends of the fitting and the inner wall of the ends of the bearing chamber in the casing $a$, thus firmly holding the two ends of the wire in a fixed position with relation to each other through the medium of the splice.

The purpose of the use of a splice embodying the invention is to increase the total length of the conductor wire during manufacturing processes so as to permit a continued operation of certain machines such as the tubular braiding machine, the asphaltum saturating tank feeding mechanism and the final waxing and polishing machine, without regard to the commercial lengths of insulated wires. By the use of the splice frequent stoppages of such machines incidental to the removal of a reel from which covered wire has been completely removed and the substitution of a new reel, is prevented as to the braiding machine and the waxing and polishing machine, and the stoppages of the asphaltum bath feeding mechanism for the making of frequent temporary splices is also avoided and at the same time the difficulties incidental to the excessive accumulation of the asphaltum composition upon the material used in making the splice and the difficulties of the cleaner through which the wire passes from the bath, are also avoided.

By making the entire splice of magnetic metal, or even the casing $a$ alone of this material, the waxing and polishing machine may be equipped with a magnet which will detect the presence of the splice and thus indicate to the operator the point at which the covering braid must be removed for the purpose of separating the ends of adjacent lengths of wire.

By making the splice of short length, it will readily conform to the curvature of the wire wound upon a reel, particularly as the diameter of the accumulated wire at any point where the splice passes to the reel will be sufficiently great to avoid any sharp bending. This approximate conformity of the diameter of the splice to that of the wire, will also facilitate the application of braid upon the splice as it is passing through the braiding machine, and will not interfere with the passage of the wire about the grooved wheels of the feeding mechanism of the asphaltum bath, and between the polishing units of the polishing machine.

The long tapered ends a' will avoid the presence of an abrupt shoulder presented in the direction of movement of the wire, when passing through the scraper associated with the asphaltum bath and the polishing units of the polishing machine. Exactitude in the diameter of the splice and of the insulation covering for the wire is not essential, the eccentricity of the end openings b' and c' naturally resulting in a slightly offset relation between the axis of the wire and that of the splice.

A splice as shown in the accompanying drawings has in actual practice been found to give highly satisfactory results in the production of cotton sliver covered insulated conductors, and to effect a saving in the production of such wires as a result of a continuous operation of the braiding machine until the cord or yarn upon the bobbins is exhausted.

While the cost of producing the splice of the invention is very low, this compared with the savings effected in the production of insulated wires as a result of the use of the splice, is a minor factor.

It is not my invention to limit the invention to the precise details of construction shown in the accompanying drawings, it being apparent that such may be varied without departing from the spirit and scope of the invention.

Having described the invention, what I claim as new and desire to have protected by Letters Patent, is:—

1. A wire splice consisting of a short cylindrical casing having a bearing chamber therein and openings through the opposite ends thereof positioned eccentrically of the axis of said chamber, a cylindrical fitting rotatably mounted in said chamber with its axis concentric with the axis of said chamber and having circular sockets in the opposite ends thereof, of substantially the same diameter as the end openings in said casing and having the same degree of eccentricity with relation to the axis of said chamber as said end openings, and means whereby relative rotative movement may be imparted to said casing and said fitting.

2. A wire splice consisting of a short cylindrical casing having a bearing chamber therein, openings through the opposite ends thereof positioned eccentrically of the axis of said chamber, and a circumferentially extending slot therethrough intermediate its ends, a cylindrical fitting rotatably mounted in said chamber with its axis concentric with the axis of said chamber and having circular sockets in the opposite ends thereof, of substantially the same diameter as the end openings in said casing and having the same degree of eccentricity with relation to the axis of said chamber as said end openings, a stop pin carried by said fitting and movable in said slot, and means whereby relative rotative movement may be imparted to said casing and said fitting.

3. A wire splice consisting of a short cylindrical casing having a bearing chamber therein, openings through the opposite ends thereof positioned eccentrically of the axis of said chamber, and a circumferentially extending slot therethrough intermediate its ends, said casing having exteriorly thereof a long taper on one end thereof and a short taper on the other end thereof, a cylindrical fitting rotatably mounted in said chamber with its axis concentric with the axis of said chamber and having circular sockets in the opposite ends thereof, of substantially the same diameter as the end openings in said casing and having the same degree of eccentricity with relation to the axis of said chamber and said end openings, a stop pin carried by said fitting and movable in said slot, and means whereby relative rotative movement may be imparted to said casing and said fitting.

4. A wire splice consisting of a short cylindrical casing having a bearing chamber therein, openings through the opposite ends thereof positioned eccentrically of the axis of said chamber, and a circumferentially extending slot therethrough and intermediate its ends, a cylindrical fitting rotatably mounted in said chamber with its axis concentric with the axis of said chamber having circular sockets in the opposite ends thereof, of substantially the same diameter as the end openings in said casing, and having the same degree of eccentricity with relation to the axis of said chamber as said end openings, and having an opening intermediate said sockets adapted to receive a key to assist in imparting relative movement to said casing and said fitting, and a stop pin carried by said fitting, movable in said slot.

5. A wire splice consisting of a short cylindrical casing having a bearing chamber therein, openings through the opposite ends thereof positioned eccentrically of the axis of said chamber, and a circumferentially extending slot therethrough and intermediate its ends, a cylindrical fitting rotatably mounted in said chamber with its axis concentric wih the axis of said chamber having circular sockets in the opposite ends thereof, of substantially the same diameter as the end openings in said casing, and having the same degree of eccentricity with relation to the axis of said chamber as said end openings, and having an opening intermediate said sockets adapted to receive a key to assist in imparting relative movement to said casing and said fitting, and a stop pin carried by said fitting, movable in said slot, said casing also having openings intermediate the slot therein and the openings at the opposite ends thereof.

6. A wire splice consisting of a short cylindrical casing having a bearing chamber therein, openings through the opposite ends thereof positioned eccentrically of the axis of said chamber, and a circumferentially extending slot therethrough and intermediate its ends, said casing having exteriorly thereof a long taper on one end thereof and a short taper on the other end thereof, a cylindrical fitting rotatably mounted in said chamber with its axis concentric with the axis of said chamber having circular sockets in the opposite ends thereof, of substantially the same diameter as the end openings in said casing, and having the same degree of eccentricity with relation to the axis of said chamber as said end openings, and having an opening intermediate said sockets adapted to receive a key to assist in imparting relative movement to said casing and said fitting, and a stop pin carried by said fitting, movable in said slot, said casing also having openings intermediate the slot therein and the openings at the opposite ends thereof.

In witness whereof I have hereunto affixed my signature this 16th day of November, 1925.

WILLIAM E. COOK.